3,285,994
PROCESS FOR THE CATALYTIC POLYMERIZA-
TION OF POLYMERIZABLE UNSATURATED
COMPOUNDS
Horst Leithauser, Marl, Germany, assignor to Chemische Werke Huls Aktiengesellschaft, Marl, Germany, a corporation of Germany
No Drawing. Filed Jan. 22, 1964, Ser. No. 339,356
Claims priority, application Germany, Apr. 2, 1963, C 29,544
2 Claims. (Cl. 260—861)

The catalytic polymerization of polymerizable unsaturated compounds often is carried out by the use of polymerization catalysts in conjunction with accelerators. These so-called initiator systems are very important for example for the mixed polymerization of unsaturated polyesters with unsaturated monomer compounds which can be polymerized thereto. In the above given case the known initiator systems comprise for example peroxidic catalysts such as benzoylperoxide, methylethyl-ketoneperoxide and cyclohexanoneperoxide with tertiary amines such as dimethylaniline, or siccatives such as cobaltnaphthenate to act as accelerator. However, since these systems have a tendency to discolor the polymerization products, it is also known in cases where constancy of color is essential, to use organic reducing compounds as accelerators such as 4-aryl-2-oxytetronimides (German Patent No. 944,220), cobalt compounds of β-ketocarboxylic acid esters or β-diketones (German Patent No. 1,005,267), dihydroxymaleic acid (U.S. Patent No. 2,809,183), hydroxytetronic acid (U.S. Patent No. 2,809,182) and d- or l-ascorbic acid (U.S. Patent No. 2,553,325).

It has been found that it is advantageous to catalytically polymerize unsaturated polymerizable compounds by use of an initiator system containing an oxygen-containing compound of trivalent phosphorus with up to equimolecular quantities of α-diketones. The catalytic effectiveness of these initiator systems is unexpected and surprising, especially since it is known that organic phosphorus compounds, for example the esters of the phosphoric acid and of the phosphorous acid, are ploymerization inhibitors, a property which leads to undesirable consequences in connection with the preparation of flameproof polymerization products where the flame resistance is due to their halogen and phosphorus contents, for example in case of synthetics on the basis of unsaturated polyesters.

Unsaturated, polymerizable compounds are, for example, hydrocarbons, esters, ethers, nitriles and amides which contain at least one polymerizable double bond, the mixtures of unsaturated polyesters, known as unsaturated polyester resin, with compounds which can be polymerized thereto as well as other mixtures of polymerizable compounds which are suitable for mixed polymerization. Some of these compounds are styrene, vinyltoluene, divinylbenzene, methacrylic acid methyl ester, methacrylic acid ethyl ester, methacrylic acid butyl ester, acrylonitrile, tertiary butylacrylamide and mixtures of these vinyl compounds with unsaturated polyesters of, for example, maleic acid, fumaric acid, itaconic acid and glycols such as ethyleneglycol, 1,3-propyleneglycol and 2-ethylhexanediol.

Oxygen-containing compounds of trivalent phosphorus, suitable for the initiator system are the mono- di- and triesters of the phosphorous acid (I), the mono- and diesters of the phosphonous acid (II) and the esters of the phosphinous acid (III). They are employed together with preferably equimolecular quantities of an α-diketone of the Formula IVa or IVb.

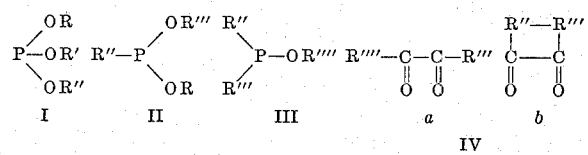

In the above formulae R and/or R' represent hydrogen or alkali metal or alkyl, aryl, cycloalkyl or aralkyl;
R", R''', R'''': are identical or dissimilar aliphatic, cycloaliphatic, aromatic or araliphatic residues which may be halogenated or jointly may be part of a ring.

The combination of compounds of the trivalent phosphorous of the above indicated structure with α-diketones result in a multitude of initiator systems which possess diverse activities and can be selected to conform to the characteristic of the compounds to be polymerized.

The phosphorus compounds are employed most suitably in quantities of from .01 to 30% by weight preferably .02 to 12% by weight, relative to the quantity of the polymerizable compound. The α-diketone is added at the most in equimolecular quantity relative to the phosphorus compound. The optimum for the polymerization differs from system to system and can be ascertained easily by experimentation.

The order in which the phosphorus compound and the α-diketone are added to the polymerizable compounds is immaterial. It is also possible to utilize the distillable 1:1 adducts which are obtained from equimolecular quantities of the phosphorus compound and the α-diketone of the general formulae

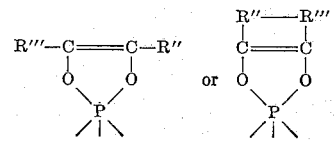

in which R" and R''' have the values stated above.

The initiator systems of the present invention are eminently suitable for block, solution, suspension and emulsion polymerizations. The polymerization is carried out most appropriately at temperatures up to 150° C., suitably in the presence of an inert gas and under pressure. However, the polymerization can be accomplished also at low temperatures within a relatively short period of time.

The process of the present invention makes it possible to control the polymerization reproducibly in the manner desired in accordance with the type of the phosphorus compound and of the α-diketone as well as the quantitative ratios within the initiator system, and to adjust it in such manner that the gel formation is accelerated in comparison with corresponding polymerization processes employing peroxides exclusively. For this reason the novel initiator systems are outstandingly suitable for the processing of unsaturated polyester resins by means of the two-component spray gun. When the systems proposed by the present invention are added by way of a nozzle—preferably dissolved in one part of the unsaturated monomer compound—to an unsaturated polyester resin which is diluted with peroxide, any dripping is prevented due to immediate gel formation. Hardening can then be accomplished quickly by increasing the temperature.

The reactions do not require any additional catalysts or activating agents although under certain circumstances the use of peroxides or hydroperoxides, either alone or in combination with accelerators, will be advisable.

Therefore, the initiator systems of the present invention offer the additional advantage that they can be employed also in conjunction with peroxides. Their effectiveness will not be lowered by phosphites, a fact which is important particularly in case of flame-proof halogen-containing polyesters where the flame resistance can be increased by the addition of phosphorus-organic compounds.

The parts mentioned in the examples given below represent parts by weight.

Example 1

Methylmethacrylate ("MME") and the various ratios given in the table below of the 1:1 adduct of triallyphosphite and diacetyl are heated to 80° C. for 4 hours in a closed vessel under a nitrogen atmosphere. The specimens mixed with the adduct gelatinize within a short period of time, and the polymerization products obtained are clear as glass, hard and only slightly soluble in benzene.

| No. | Parts MME | Parts adduct | Polymerization Product | Remarks |
|---|---|---|---|---|
| 1 | 10 |  |  | Starting material recovered. |
| 2 | 9 | 1 | Very slightly soluble in benzene. | Gelatinized after 1 hour, swellable in benzene, 92% yield. |
| 3 | 10 | .05 | do | Gelatinized after 2½ hours, swellable in benzene. |
| 4 | 9 | 1+.2 parts of benzoyl-peroxide. | Almost completely soluble in benzene. | Gelatinized after 2 hours. |

Example 2

9 parts of a 55% solution of divinylbenzene in ethylbenzene are heated with one part of the adduct of Example 1 in a closed vessel to 80° C. under a nitrogen atmosphere. The mixture gelatinizes after 8 hours. The polymerization product is insoluble in benzene. The yield is 54.5% relative to the divinylbenzene.

Example 3

10 parts of acrylonitrile are added under a nitrogen atmosphere to 1 part of the adduct as set forth in Example 1. After a short period of time the polymer begins to separate and the reaction is practically completed after 5 to 6 hours. A control test conducted without the adduct leaves the specimen unchanged. A polymerization test conducted with the addition of adduct and .2 part of benzyl peroxide paste (50%) gelatinizes after approximately ½ hour. After approximately one hour at 50° C. spontaneous polymerization takes place with partial decomposition.

Example 4

10 parts of acrylic acid butyl ester are added to .05 part of the adduct as set forth in Example 1 under a nitrogen atmosphere. After 1½ hours the preparation has become gelatinized, colorless and clear.

Example 5

5 parts of divinylbenzene, 4 parts of styrene and 1 part of the 1 to 1 triallylphosphite/diacetyl adduct are heated for two days under a nitrogen atmosphere in a closed vessel to 80° C. The yield of polymerization products is 73.5% relative to divinylbenzene/styrene.

Example 6

In the tests given below there is utilized an unsaturated polyester which was prepared by condensation of .5 mole of HET-acid anhydride (1,4,5,6,7,7-hexachlorobicyclo-[2,2,1]-5-heptene - 2,3 - dicarboxylic - acid-anhydride), 1 mole of maleic acid anhydride, .5 mole of phthalic acid anhydride, 1.03 moles of glycol and 1.05 moles of diglycol up to an acid value of 35.2. The chlorine content of the polyester is 21.4%.

(a) 6.7 parts of polyester and 3.3 parts of styrene are mixed with .05 part of the 1 to 1 triallylphosphite/diacetyl adduct. The specimens gelatinize after approximately 2 minutes and are insoluble in benzene.

If .3 part of adduct are used the specimen will gelatinize immediately.

(b) 6.3 parts of polyester, 3.2 parts of styrene and 5 parts of triallylphosphite will gelatinize upon the addition of .2 to 5% by weight of adduct in accordance with Example 6a within the following time periods:

.2% of adduct: approx. 30 minutes
.3% of adduct: approx. 20 minutes
.4% of adduct: approx. 15 minutes
.5% of adduct: approx. 2 minutes
1% of adduct: approx. 2 minutes
2% of adduct: approx. 1 minute
3–5% of adduct: immediately.

(c) .2 part of benzoyl peroxide paste (50%) and then 1 part of 1 to 1 triethylphosphite/diacetyl adduct are added to a solution of 6 parts of polyester in 3 parts of styrene. Upon stirring at room temperature the specimen will gelatinize within 1 hour. At 80° C. it will harden in 1 hour.

(d) In the same manner the polyester can be hardened with 1 part of 1 to 1 tris-(β-chloroethylphosphite)/diacetyl adduct. The specimen will harden after ½ hour.

(e) 6 g. of polyester, 3 g. of styrene, .2 cm.³ of a (20%) solution of cobaltnaphthenate and .4 cm.³ of cyclohexanone-peroxide (50%) are mixed together at room temperature. Upon addition of 1 g. of 1 to 1 triallylphosphite/diacetyl adduct the specimen gelatinizes within a few minutes and can then be hardened at 50° C. The specimen is spontaneously extinguishing.

(f) .2 cm.³ of a (20%) solution of cobaltnaphthenate and .4 cm.³ of cyclohexanoneperoxide (50%) are added to a mixture of 6 g. of polyester and 3 g. of styrene. 1 g. of 1 to 1 adduct of phenyl-phosphonic-acid-bis-(chloropropylester) and diacetyl are added thereto under stirring and a polyester resin which hardens immediately is formed.

If the cobaltnaphthenate/cyclohexanoneperoxide is substituted by .2 g. of benzoylperoxide paste, the specimen will harden to a large extent at room temperature.

(g) 6.5 parts of polyester, 2.5 parts of styrene and 1 part of triethylphosphite are mixed together at room temperature. Upon addition of .1 part of diacetyl in .5 part of styrene the specimen will gelatinize into a colorless, clear and non-adhesive resin.

(h) 6.5 parts of polyester, 3 parts of styrene and .1 part of diacetyl are mixed together. Upon addition of 1 part of triethylphosphite the strongly yellowish specimen becomes colorless and solidifies into a mass which is clear as glass.

Example 7

300 g. of water, .5 g. of polyvinylalcohol and 100 g. of methacrylic acid butylester are placed into a 2 liter polymerization vessel equipped with a stirrer, a thermometer and a reflux condenser. Nitrogen is used for scavenging and the mixture is heated to 80° C. At a stirring speed of 500 r.p.m. 10 g. of 1 to 1 triallylphosphite/diacetyl adduct are added drop by drop and thereafter the temperature is maintained at 80° C. for 6 hours. Thereupon .5 g. of hydroquinone are added and the non-converted monomer is distilled in steam. The polymerization product is removed by filtering, reduced to small pieces, washed thoroughly with water and methanol and dried in vacuum at 70° C. The yield is 86%, relative to the methacrylic acid butyl ester.

*Example 8*

(a) 93 parts of a commercial polyester resin (VESTOPAL A), 2 parts of benzoylperoxide paste (50%) and 5 parts of 1 to 1 trioctylphosphite-diacetyl adduct are mixed together at room temperature. The specimen gelatinizes with a temperature rise up to 42° C. By tempering at 80° C. a completely hardened product is obtained.

(b) To 93 parts of a commercial polyester resin with the basis: tetrachlorophthalic acid, fumaric acid and propyleneglycol, containing 35% by weight of styrene there are added at room temperature 2 parts of benzolperoxide paste (50%) and thereupon 5 parts of 1 to 1 trioctylphosphite-diacetyl adduct. The temperature rises to 108° C. The specimen obtained is well hardened.

*Example 9*

(a) 10 g. of a commercial polyester resin (VESTOPAL H) and .4 cm.³ of cyclohexanoneperoxide (50%) are mixed together at room temperature. Upon addition of 1 cm.³ of 1 to 1 benzyl-trimethylphosphite adduct the specimen gelatinizes after 1 minute and hardens with a rise in temperature to approximately 50° C.

(b) 93 parts of a commercial polyester resin (VESTOPAL TS), 2 parts of benzoylperoxide paste (50%) and 5 parts of 1 to 1 benzyl-trimethylphosphite adduct are mixed together at room temperature. The specimen gelatinizes and hardens completely with a rise in temperature up to 156° C.

*Example 10*

To 10 g. of a commercial polyester resin (VESTOPAL H) there are added .2 g. of benzoylperoxide paste (50%) and thereupon 1 cm.³ of 1 to 1 pentanedione-(2,3)-triethylphosphite adduct. The specimen gelatinizes upon stirring at room temperature after approximately 2 minutes. By tempering at 80° C. a hard product is obtained.

*Example 11*

(a) 93 g. of a commercial polyester resin (VESTOPAL TS), 2 g. or benzoylperoxide paste (50%) and 5 cm.³ of 1 to 1 1-phenyl-propanedione-(1,2)-tributylphosphite adduct are mixed together. The reaction temperature rises to 150° C. and a completely hardened specimen is obtained.

(b) 10 g. of a commercial polyester resin (VESTOPAL TS) are mixed with .2 g. benzoylperoxide paste (50%) and .08 g. of 1-phenyl-propanedione-(1,2). Upon addition of .25 g. of diphenylphosphinous acid ethylester the mixture gelatinizes after 38 minutes. By tempering at 80° C. a hard and clear specimen is obtained.

*Example 12*

10 g. of a commercial polyester resin (VESTOPAL H), .2 g. of benzoylperoxide paste (50%) and .2 cm.³ of diacetyl are mixed at room temperature. Upon addition of .6 cm.³ of diphenylphosphinous acid-(1-chloro-isopropylester) the mixture gelatinizes after 1 minute. By tempering a hard and clear specimen is obtained.

*Example 13*

To 10 g. of a commercial polyester resin (VESTOPAL TS) there are added .2 g. of benzoylperoxide paste (50%) and 65 g. of cyclododecandione-(1,2). Upon addition of .6 cm.³ of triethylphosphite the mixture gelatinizes with a slight rise in temperature after approximately 2 minutes. By tempering at 80° C. a hard specimen is obtained.

The molecular ratio of α-diketone to oxygen containing compound of trivalent phosphorus varies within the range from .05:1 to 1:1.

Vestapal A, referred to in Example 8a, is a polyester resin based upon phthalic acid, fumaric acid, glycol and diglycol and contains 33% by weight of styrene. Vestopal H, referred to in Examples 9a, 10 and 12 is a polyester resin based upon phthalic acid, fumaric acid and propylene glycol which contains 33% by weight of styrene. Vestopal TS, referred to in Examples 9b, 11a, 11b and 13, is a polyester resin based on tetrahydrophthalic acid, fumaric acid, glycol and diglycol which contains 35% by weight of styrene.

I claim:

1. Process for the polymerization of esters of unsaturated acids, vinyl aromatic compounds and mixtures of esters of unsaturated acids with vinyl aromatic compounds which comprises carrying out the polymerization in the presence of 0.01 to 30% based upon the weight of polymerizable compound of a catalyst system which is the 1:1 adduct of an ester of an acid selected from the group consisting of phosphorous acid, phosphonous acid and phosphinous acid with α-diketones and having the general formula

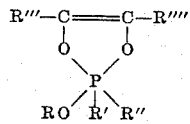

in which R stands for a member selected from the group consisting of hydrogen, alkali metals, and alkyl, cycloalkyl, aryl and aralkyl groups which may be halogenated, R' stands for a member selected from the group consisting of the alkyl, cycloalkyl, aryl, aralykyl and OR groups which may be halogenated, R" stands for a member selected from the group consisting of the alkyl, cycloalkyl, aryl, aralkyl, O-alkyl, O-cycloalkyl, O-aryl and O-aralkyl groups which may be halogenated, R''' and R'''' each stands for a member selected from the group consisting of the alkyl, cycloalkyl, aryl and aralkyl groups which may be halogenated, and in which the pairs R' and R" and R''' and R'''' may belong to the same ring, at least one of R', R", R''' and R'''' being such a group as will assure that the compound of said general formula is an ester.

2. Process as defined in claim 1 in which the polymerization is carried out in the presence of a catalyst of the group consisting of peroxides and hydroperoxides.

References Cited by the Examiner

UNITED STATES PATENTS

| | | | |
|---|---|---|---|
| 2,335,521 | 11/1943 | Lasher | 252—426 |
| 2,543,636 | 2/1951 | Loritsch | 260—80 |
| 2,881,156 | 4/1959 | Pilar et al. | 260—94.9 |
| 2,877,204 | 3/1959 | Duhnknack et al. | 260—865 |
| 2,986,507 | 5/1961 | Steck | 204—158 |
| 3,214,494 | 10/1965 | Harris | 260—880 |

MURRAY TILLMAN, *Primary Examiner.*

J. T. GOOLKASIAN, *Assistant Examiner.*